United States Patent [19]

Schubert et al.

[11] Patent Number: 5,030,608
[45] Date of Patent: Jul. 9, 1991

[54] PROCESS FOR THE PREPARATION OF COMPOSITE MATERIALS WHICH CONTAIN SMALL PARTICLES OF METAL OR METAL OXIDE IN AN OXIDE MATRIX AND THE COMPOSITE MATERIALS PREPARED BY THE PROCESS

[75] Inventors: Ulrich Schubert; Sabine Amberg-Schwab, both of Würzburg; Boris Breitscheidel, Fulda; Helmut Schmidt, Zellingen, all of Fed. Rep. of Germany

[73] Assignee: Fraunhofer-Gesellschaft zur Forderung der Angewandten Forschung E.V., Munich, Fed. Rep. of Germany

[21] Appl. No.: 482,864

[22] Filed: Feb. 22, 1990

[30] Foreign Application Priority Data

Aug. 23, 1989 [JP] Japan .................................. 1-217174

[51] Int. Cl.$^5$ ..................... B01J 23/42; B01J 23/44; B01J 23/72; B01J 23/74
[52] U.S. Cl. ................................... 502/300; 502/325; 502/337; 502/338; 502/339; 502/344; 502/345
[58] Field of Search ............... 502/325, 337, 338, 339, 502/344, 345, 300

[56] References Cited

U.S. PATENT DOCUMENTS 4,102,819  7/1978  Petrow et al. .................. 502/325 X
4,937,219  6/1990  Haruta et al. ................... 502/344 X Primary Examiner—W. J. Shine
Attorney, Agent, or Firm—Oblon, Spivak, McClelland, Maier & Neustadt

[57] ABSTRACT

Composite materials which contain small particles of metal or metal oxide in an oxide matrix are prepared by a process which comprises a) subjecting (1) one or more metal compounds and (2) one or more bifunctional compounds which contain at least one group capable of complexing the metal and at least one group which forms an inorganic network during the polycondensation, and if appropriate (3) one or more network-forming agents which are capable of polycondensation to the conditions of a complexing reaction and hydrolytic polycondensation by the sol-gel process in a liquid reaction medium, compounds (1), (2) and (3) being soluble in the reaction medium, and b) oxidizing the resulting polycondensate to form a composite material which contains small metal oxide particles with the very narrow particle size distribution in an oxide matrix, and if appropriate c) reducing the metal oxide particles of the resulting composite material to the metal. These composite materials are used as catalysts and in electrical or electronic components.

14 Claims, 1 Drawing Sheet

PROCESS FOR THE PREPARATION OF COMPOSITE MATERIALS WHICH CONTAIN SMALL PARTICLES OF METAL OR METAL OXIDE IN AN OXIDE MATRIX AND THE COMPOSITE MATERIALS PREPARED BY THE PROCESS

BACKGROUND OF THE INVENTION

The invention relates to a process for the preparation of composite materials which contain small particles of metal or metal oxide in an oxide matrix, the composite materials obtainable by this process and their use as catalysts and in electrical and electronic components.

For many uses, for example in the field of catalysis and in the field of electrical and electronic components, composite materials which contain small particles of metal or metal oxide in oxide matrices (ceramic matrices and ceramic-related matrices) are desirable. These are often achieved by impregnation of ceramic and ceramic-related bodies with metal salts and subsequent reduction thereof to the metal. However, metal particle sizes in the lower nanometer range as a rule cannot be achieved in this way. Moreover, the metal component is applied only to the outer surface of the ceramic material and not into the pores, and the charging of the support with metal is limited.

The sol-gel process on principle offers a solution for preparing composite materials having a high dispersion of the incorporated components, since the starting compounds can be mixed with one another at the molecular level. Several research groups have attempted to prepare composite materials of the type mentioned by the sol-gel process by subjecting silicic acid esters or aluminium nitrate to polycondensation in the presence of metal salts. Metal particles have been produced by subsequent reduction of the gels, but in most cases their diameters do not lie within the lower nanometer range. This method is described, for example, in the following publications: R. A. Roy, R. Roy, Mat. Res. Bull. 19 (1984), 169; R. Roy, S. Komarneni, D. M. Roy, Mat. Res. Soc. Symp. Proc. 21 (1984), 347; G. N. Subbanna, C. N. R. Rao, Mat. Res. Bull. 21 (1986), 1465; and F. Orgaz, H. Rawson, J. Non-Cryst. Solids 82 (1986), 378. The most important disadvantage of this method is that the metal particle size and distribution are scarcely controllable and meet the desired requirements (homogeneous dispersion, very small particle diameter, narrow particle size distribution) only in a few cases.

Ueno et al. (A. Ueno, H. Suzuki, Y Kotera, J. Chem. Soc. Faraday Trans I 79 (1983), 127; K. Tohij, Y. Udagawa, S. Tanabe, A. Ueno, J. Am. Chem. Soc. 106 (1984), 612; H. Tanagawa, K. Oyama, T. Yamaguchi, H. Tanaka, H. Tsuiki, A. Ueno, J. Chem. Soc. Faraday Trans I 83 (1987), 3189; S. Tanabe, T. Ida, M. Suginage, A. Ueno, Y. Kotera, K. Tohij, Y. Udagawa, Chem. Letters (1984), 1567; T. Akiyama, E. Tanigawa, T. Ida, H. Tsuiki, A. Ueno, Chem. Letters (1986), 723; and T. Seiji, F. Koga, S. Tanabe, A. Ueno, Y. Kotera, Nippon Kagaku Kaishi (1984), 998) have reported that composite materials with small and homogeneously distributed metal particles in $SiO_2$ are obtainable from solutions of metal glycolates and tetraethoxysilane via the sol-gel process after corresponding after-treatment of the gels. The metal glycolates are produced in situ from the corresponding metal nitrates in ethylene glycol. It has been found by EXAFS spectroscopy that after addition of tetraethoxysilane to the solution of the metal glycolate, some glycolate radicals are replaced by $OSi(OEt)_3$ radicals. Linking of the metal ion to the silicate matrix which forms takes place via the alkoxysiloxyl radicals during the polycondensation. Small metal particles are formed by drying the gels and subsequent reduction. The limitation of this method is that composite materials can be prepared only with those metals which form glycolates, that is to say are oxophilic.

SUMMARY OF THE INVENTION

The object of the invention is therefore to provide composite materials which contain particles of metal and metal oxide of very small particle diameter and narrow particle size distribution in uniform dispersion in an oxide matrix. A process for the preparation of such composite materials which can be carried out with virtually all metals and allows a high charging of the oxide matrix with metal is furthermore to be provided.

The invention relates to a process for the preparation of composite materials which contain small particles of metal or metal oxide in an oxide matrix, which is characterized in that a) (1) one or more metal compounds and (2) one or more bifunctional compounds which contain at least one group capable of complexing the metal and at least one group which forms an inorganic network during the polycondensation, and if appropriate (3) one or more network-forming agents which are capable of polycondensation are subjected to the conditions of a complexing reaction and hydrolytic polycondensation by the sol-gel process in a liquid reaction medium, compounds (1), (2) and (3) being soluble in the reaction medium, and b) the resulting polycondensate is oxidized to form a composite material which contains small metal or metal oxide particles in an oxide matrix, and if appropriate c) the metal oxide particles of the resulting composite material are reduced to the metal.

The invention also relates to the composite materials obtainable by this process and their use as catalysts and in electrical or electronic components.

DEFINITIONS

In the following text, alkyl radicals denote straight-chain, branched or cyclic radicals having 1 to 20, preferably 1 to 10, carbon atoms, and in particular lower alkyl radicals; lower alkyl radicals contain 1 to 6, preferably 1 to 4, carbon atoms.

Examples of alkyl are dodecyl, octadecyl and lower alkyl radicals, such as methyl, ethyl, n-propyl, isopropyl, n-butyl, isobutyl, sec-butyl, t-butyl n-pentyl, N-hexyl, cyclopentyl and cyclohexyl.

The alkoxy, alkoxyalkoxy, acyloxy, alkylamino, dialkylamino, alkoxycarbonyl and alkylcarbonyl radicals are derived from the abovementioned alkyl radicals. Specific examples are: methoxy, ethoxy, n- and i-propoxy, n-, sec- and t-butoxy, isobutoxy, $\beta$-methoxyethoxy, acetoxy, propionyloxy, monomethylamino, monoethylamino, dimethylamino, diethylamino, methylcarbonyl, ethylcarbonyl, methoxycarbonyl and ethoxycarbonyl.

The aryl and arylene radicals preferably contain 6 to 14 carbon atoms, such as phenyl, naphthyl, phenylene and naphthylene.

Halogen denotes fluorine, chlorine, bromine or iodine.

BRIEF DESCRIPTION OF THE DRAWING

The FIGURE shows the particle size distribution for the palladium-containing composite material prepared from polycondensate KA.

DETAILED DESCRIPTION OF THE INVENTION

Metal Compounds

Figure 1:
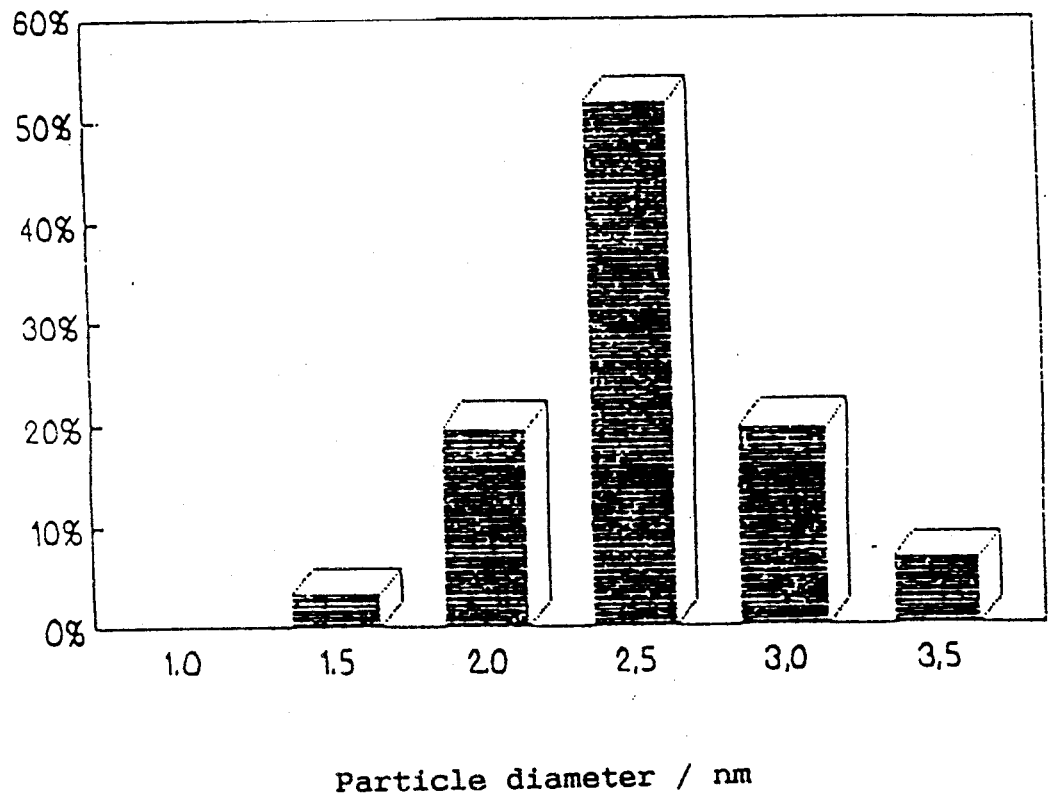

Metal compounds which are soluble in the reaction medium are employed as the starting compounds (1) in the process according to the invention. A preferred group of these metal compounds has the general formula $$M_iX_mY_n \qquad (I)$$

wherein M represents a neutral or positively charged metal atom, X is an anion, Y is a neutral ligand, i is an integer having a value $\geq 1$ and m and n have the value 0 or are integers having a value $\geq 1$, (m+n) having a value sufficient for compensation of the charge and for coordination saturation of $M_i$.

In the preparation of composite materials which contain metal oxide particles, M can be chosen from any desired metal of the periodic table. Preferred metals are the transition metals, including the lanthanides and actinides, and the main group metals gallium, indium, thallium, tin, lead, antimony and bismuth. In the preparation of composite materials which contain metal particles, the metal oxide must be easier to reduce than the oxide matrix. For this reason, the metals just mentioned as preferred are primarily used.

The metal compounds can also contain several metal atoms (that is to say i is an integer >1), which can be identical or different, for example they can be in the form of polynuclear complexes or in the form of alkali metal or alkaline earth metal salts of metal complex anions. The simplified formula $MX_mY_n$ used below includes the case where i >1. Any charging of the metal atom corresponds to the customary oxidation levels of the elements mentioned.

X in the above general formula (I) represents an anion which imparts to the metal compound solubility in the reaction medium. X should not prevent complexing by the bifunctional group which is capable of complexing and is discussed below. The anion can carry one or, if appropriate, more negative charges.

These anions may include, for example, the halides, sulphate and phosphate. However, anions which decompose without trace to give volatile compounds during the subsequent oxidation of the composite materials are preferred. These are above all anions which are derived from the elements carbon, nitrogen, oxygen and hydrogen.

Examples of anions of this type which carry a single negative charge are: hydroxyl, nitrite, nitrate, azide, cyanide, bicarbonate, alkanolates, such as methylate, ethylate, isopropylate and butylate, phenolate, alkanoates, such as formate, acetate and propionate, benzoate and hydride. Complexing monovalent anions which contain an additional coordination site in the form of an oxygen or nitrogen atom or a double or triple bond can also be employed, for example acetylacetonate, the troponolate anion and acrylate and gamma-aminocarboxylate compounds, and furthermore negatively charged aromatic systems which form π-complexes, such as the cyclopentadienyl or pentamethylcyclopentadienyl anion.

The anions which carry two negative charges and can be used according to the invention also act in most cases as bi- or multidentate complexing agents. Examples are carbonate, oxalate, tartrate, maleate, succinate, phthalate, glycolate and pyrocatecholate. If appropriate, anions having more than two negative charges can also be employed, for example citrate.

The integer m is determined by the charge of the metal ion and the charge of the anion, so that the compound $M_iX_mY_n$ is neutral. If the metal atom or the metal atoms carry no charge, m is 0. Various anions X can also occur in the metal compounds according to the invention. In this case, each individual m is specified such that the sum of all the charges of the various anions corresponds to the charge of the metal ion or metal ions.

Y in the above general formula represents a neutral ligand, which can be monodentate, bidentate or multidentate, and preferably contains only the elements carbon, hydrogen, oxygen, nitrogen and sulphur.

Examples of monodentate neutral ligands of this type are water, carbon monoxide, nitrogen monoxide, nitrogen dioxide, ammonia, primary, secondary and tertiary amines, alkyl radicals, ligands having a double or triple bond which participates in the coordination, such as ethylene, acetylene and also oxygen, and σ-bonded aryl radicals, such as phenyl. Examples of bidentate neutral ligands are β-ketocarboxylic acid esters, such as acetoacetates, primary, secondary and tertiary diamines, such as ethylenediamine and 2,2-dipyridyl, and ligands having several double and triple bonds which participate in the coordination, such as cyclooctadiene and butadiene units. Neutral compounds of the abovementioned elements containing more than two coordinating electron pairs can also be employed according to the invention as ligands, such as $\sigma^6$-bonded aromatic compounds, for example $\sigma^6$-benzene, cyclooctatetraene or σ-bonding tri- and multidentate ligands, such as, for example, terpyridyl, diethylene glycol dimethyl ether and crown ethers. However, it must be ensured that in the metal compound at least one coordination site which is occupied by an anion or a neutral ligand can easily be accessible to another ligand.

The number of neutral ligands, that is to say n, can be 0. If it is greater than 0, its value depends on the free coordination sites which remain on the metal atom after any occupation by the anions X. The total number of coordination sites on a given metal atom or ion is known to the expert.

Concrete examples of metal compounds which are particularly preferred according to the invention are: $AgNO_3$, $Co(NO_3)_2$, $Co(acetate)_2.4H_2O$, $Co(CO)_3(NO)$, $(\eta^3$-allyl$)Co(CO)_3$, $(\eta^6-C^6H^6)Cr(CO)_3$, $Cu(acetate)_2.H_2O$, $Na_2[Cu(CN)_3].3H_2O$, $Fe(acetylacetonate)_3$, $Fe(NO_3)_3$, $Fe(CO)_5$, $[Fe(ethylenediamine)_3]Cl_2$, $(\eta^5-C_5H_5)(CO)_2Mn(cyclooctene)$, $(\eta^6-C_6H_6)Mo(CO)_3$, $Ni(NO_3)_2.6H_2O$, $Ni(acetate)_2.4H_2O$, $[Ni-ethylenediamine)_2](acetate)_2$, $Ni(CO)_4$, $Pb(C_6H_5)_4$, Pd-(acetylacetonate)$_2$, Pt(acetylacetonate)$_2$, bis(cycloocta-1,5-diene)platinum(O), $V(CO)_6$, $(\eta^6-C_6H_6)W(CO)_3$ and $U(C_8H_8)_2$. Examples of polynuclear metal compounds or salts of metal complex anions are: $Ru_3(CO)_{12}$, $Fe_2(CO)_9$, $Mn_2(CO)_{10}$, $Re_2(CO)_{10}$, $Co_2(CO)_8$, $Na_2[PtCl_6]$ and $K_2[PtCl_6]$.

One or more of the metal compounds (I) can be employed in the process of this invention.

Bifunctional Compounds

The starting compounds (2) of the process according to the invention are bifunctional compounds which are soluble in the reaction medium and contain at least one group capable of coordination of the metal and at least one group which forms an inorganic network during the polycondensation. A preferred group of such bifunctional compounds can be represented by the following general formula:

$$A_g z[ER_o R'_p]_h \quad (II)$$

wherein A represents the group which is capable of complexing the metal of the metal compound (1), z is a hydrolysis-stable bridge group which is inert in the reaction medium of the hydrolytic polycondensation and $-[ER_o R'_p]$ is a group which forms an inorganic network during the polycondensation, g, h and o are integers having a value $>0$ and p has the value 0 or is an integer having a value $\geq 1$, (o+p) having a value adequate for charge compensation with E.

The complexing group A is an electron donor, which if appropriate can also have electron acceptor properties by re-bonding of the metal in any $\pi$-orbitals of the group A. The group A can be of neutral or negative electric charge. It is preferably composed of elements which are converted into volatile compounds during oxidation of the composite compounds; that is to say of the elements carbon, nitrogen, oxygen, sulphur and hydrogen. Bonding to the metal can take place via a $\sigma$- or a $\pi$-bond. It is also possible for several groups A to be present in the bifunctional compound (II), and these may be different; g is then greater than 1. If the steric circumstances allow, these groups A form a chelate complex with the metal compound.

Examples of complexing groups A according to the invention are: primary, secondary and tertiary amines, nitrile, isonitrile, thiocyanate, isothiocyanate, cyanate, isocyanate, azide, thiolate, sulphinate, sulphonate, carboxylate, carbonyl, alcoholate, hydrocarbon radicals with double and triple bonds, such as, for example, vinyl and ethinyl, and aromatic radicals, such as, for example, the cyclopentadienyl anion, phenyl, furyl, thienyl and pyridyl. Primary, secondary and tertiary amines and radicals having a double bond are particularly preferred.

Examples of preferred molecule radicals which contain 2 complexing groups A are the ethylenediamine radical and its alkylated secondary and tertiary analogues, the glycolate radical, the $\beta$-ketocarboxylic acid radical or ester thereof, the acetylacetonate radical, the butadiene radical, the cyclooctadiene radical and the acrylic acid or acrylate radical.

The choice of the radical A depends on the properties of the metal compound $M(X)_m(Y)_n$ used and on the properties of the second group which is also present in the bifunctional compound and can form an inorganic network during the polycondensation. The group A will thus be chosen so that it does not react with the central atom E of the network-forming group $-[ER_o R'_p]$ (see below) in the reaction medium, but as far as possible reacts exclusively with the metal compound. If, for example, silicon is the central atom E of the network-forming group, one or more amine groups can advantageously be used as the group A in order to complex suitable metal compounds, for example compounds of nickel or iron. If aluminium is the network-forming central atom, an unsaturated aliphatic or aromatic radical A is advantageously employed for complexing suitable metal ions, for example iron or platinum. The expert is familiar with estimating what metal atoms can be complexed with what complexing groups A without A reacting preferentially with $-[ER_o R'_p]$.

The network-forming group(s) $-[ER_o R'_p]_h$ of the bifunctional compound (II) contains a central atom E chosen from the elements silicon, aluminium, titanium, zirconium, tin, germanium, boron, phosphorus and arsenic. The bridge group z is bonded to this central atom, as well as at least one hydrolyzable group R such as is defined below with the compounds of the formula (111) which can be employed as network-forming agents (3), and if appropriate one or more non-hydrolyzable groups R' such as are likewise defined below with the network-forming agents. If no network-forming agent (3) is employed in the process according to the invention in addition to the metal compound (1) and the bifunctional compound (2), the network-forming group of the bifunctional compound (2) must contain at least 2 hydrolyzable groups R, that is to say $o \geq 2$. If a network-forming agent (3) is used, one hydrolyzable group R is sufficient; in this case $o \geq 1$. The sum (o+p) has a value which is adequate for compensation of the charge of E and depends on the individual network-forming elements. The sum (o+p+l) corresponds to the sum (q+r) discussed for the network-forming agents.

The bifunctional compound (II) can contain several groups capable of network formation; h in the formula (II) is then $>1$. For simplicity, the indices g and h are omitted below in the formula (II), which then therefore reads $AzER_o R'_p$. This is intended to include the case where several groups A and $ER_o R'_p$ can also be present.

The bridge group z is a hydrolysis-stable group formed from the elements C, H, 0, N and S which is inert in the reaction medium of the hydrolytic polycondensation and links the group(s) A and the group(s) $-ER_o R'_p$. It consists of an optional spacer group z' which is linked to A and if appropriate also bonds several groups A to one another, and of one or more groups C which link the group z to the central atom of the polycondensable group, that is to say E:

$$A-z'-A-z'C-E$$

In the extreme case, C can consist only of a single bond, for example: phenyl-Si-$(R^1)_o(R^2)_p$, wherein phenyl represents the functional group A, which can serve, for example, as a ligand for a molybdenum, chromium or manganese ion or atom. C can furthermore be, for example, a methylene or methine group, a tertiary carbon atom or an alcoholate, carbonyl or carboxylate group, or a simple or conjugated double- or triple bond system, such as, for example, a cyclopentadienyl anion. In all cases the group C in a specific bifunctional compound A-z'C—$ER_o R_p$ according to the invention must be such that the hydrolysis of the bond between C and E proceeds so slowly that the bond is not noticeably hydrolyzed by the end of the hydrolysis and polycondensation reaction of $-ER_o R'_p$. This of course depends not only on the nature of C but also on E and the hydrolyzable radicals R thereof. The expert is familiar with assessing the circumstances on the basis of the data available on the rates of hydrolysis of individual groups.

The optional spacer group z' joins the group A to the group C and if appropriate various groups A to one another. If A and C are linked directly, no spacer group z' occurs. z' in general consists of alkylene, arylene or alkylenearylene groups, which can be interrupted by oxygen and/or sulphur atoms.

The following concrete examples of bifunctional compounds which are preferred according to the invention are given in order further to illustrate the bifunctional compounds of the formula (II) according to the invention:

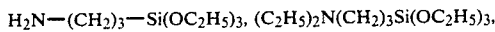

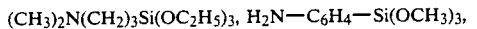

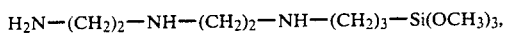

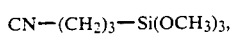

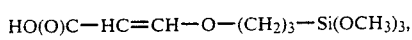

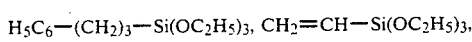

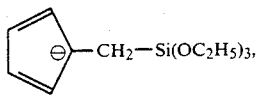

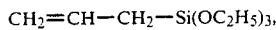

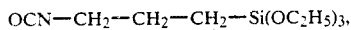

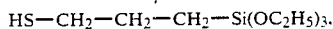

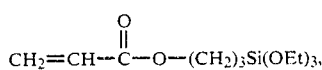

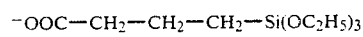

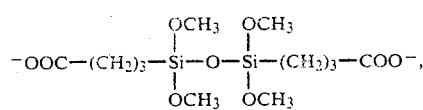

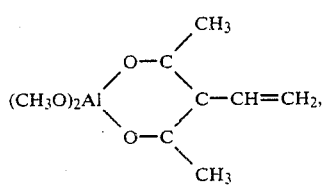

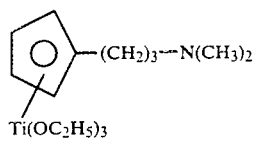

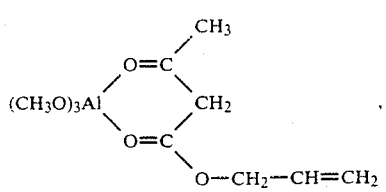

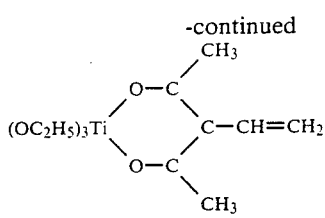

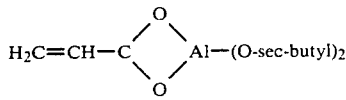

These compounds are obtainable in some cases from the chemical industry, or they can be prepared in a known manner (see, for example, W. Noll: "Chemie und Technologie der Silicone" (Chemistry and Technology of Silicones), Verlag Chemie, Weinheim/Bergstraße (1968)).

One or more different bifunctional compounds defined above can be employed according to the invention. If appropriate, these can also be in pre-condensed form.

Network-Forming Agents

The network-forming agent (3) which is capable of polycondensation and does not have to be used obligatorily in the process according to the invention, but is preferably employed, is likewise a compound which is soluble in the reaction medium and preferably has the general formula $$ER_qR'_r \tag{III}$$

In this formula, the element E is preferably chosen from silicon, aluminium, titanium, zirconium, tin, germanium, boron, phosphorus and arsenic. The groups R are hydrolyzable groups and the groups R' are groups which are non-hydrolyzable or difficult to hydrolyze. Their specific meaning is discussed with the compounds $ER_qR'_r$ of the individual elements E. The index q is an integer $\geq 2$ in at least one of the network-forming agents employed, r is $=0$ or an integer $\geq 1$ and the sum $(q+r)$ has a value adequate for compensating the charge with E.

Preferred network-forming compounds of silicon which are employed in the process according to the invention have the general formula $$R_qSiR'_r$$

wherein $q+r=4$ and r is 0, 1 or 2 (assuming monovalent radicals R and R'); the radicals R, which can be identical or different and at least 2 of which are present, are hydrolyzable radicals such as hydrogen, hydroxyl, halogen, alkoxy, alkoxyalkoxy, acyl, acyloxy, alkoxycarbonyl or $NR''_2$ ($R''=H$ and/or alkyl); and the radicals R', which can be identical or different, are non-hydrolyzable organic groups, such as alkyl, aryl, arylalkyl and alkylaryl, it being possible for these radicals to be interrupted by O or S atoms.

Specific examples of the groups R are methoxy, ethoxy, n- and i-propoxy, n-, sec- and t-butoxy, isobutoxy, β-methoxyethoxy, acetoxy, propionyloxy, monomethylamino, monoethylamino, dimethylamino, diethylamino, N-ethylanilino, methylcarbonyl, ethylcarbonyl, methoxycarbonyl and ethoxycarbonyl.

Specific examples of the groups R' are methyl, ethyl, 3-phenethyl and 4-i-propylphenyl.

Concrete examples of compounds of the formula $R_qSiR'_r$ are:

| | |
|---|---|
| r = 0: | Si(OCH$_3$)$_4$, Si(OC$_2$H$_5$)$_4$, Si(O-n- or -i-C$_3$H$_7$)$_4$, Si(OC$_4$H$_9$)$_4$, SiCl$_4$, HSiCl$_3$ and Si(OOCCH$_3$)$_4$. |
| r = 1: | CH$_3$—Si—Cl$_3$, CH$_3$—Si—(OC$_2$H$_5$)$_3$, C$_2$H$_5$—Si—Cl$_3$, C$_2$H$_5$—Si—(OC$_2$H$_5$)$_3$, C$_3$H$_7$—Si—(OCH$_3$)$_3$, C$_6$H$_5$—Si—(OC$_2$H$_5$)$_3$ and C$_6$H$_5$—CH$_2$—Si—(OC$_2$H$_5$)$_3$. |
| r = 2: | (CH$_3$)$_2$—Si—Cl$_2$, (CH$_3$)$_2$—Si—(OC$_2$H$_5$)$_2$, (C$_2$H$_5$)$_2$—Si—(OC$_2$H$_5$)$_2$ and (C$_2$H$_5$O)$_2$(CH$_3$)Si—CH$_2$—C$_6$H$_5$. |

These silanes are commercial products in some cases, or they can be prepared by known methods; compare W. Noll, "Chemie und Technologie der Silicone" (Chemistry and Technology of the Silicones), Verlag Chemie, Weinheim/Bergstraβe (1968).

Compounds of aluminium which can be used as network-forming agents are compounds of the general formula $$AlR_qR'_r$$

in which the radicals R, which can be identical or different, represent hydrolyzable groups, such as halogen, alkyl, alkoxy, acyloxy or hydroxyl, or represent the anions of aluminium salts of inorganic or organic acids, such as, for example, HNO$_3$, H$_2$SO$_4$, H$_3$PO$_4$ and formic acid, acetic acid, propionic acid and oxalic acid; and the radicals R' denote non-hydrolyzable groups which, in the case of aluminium compounds, are preferably chelating ligands which contain oxygen atoms at the complexing sites. Such chelating ligands are, for example, acetylacetonate, ethyl acetate and glycolate.

The aluminium compounds employed as network-forming agents should contain at least 2 hydrolyzable groups R, that is to say q can be 2 or 3 (in monovalent radicals R). The number of non-hydrolyzable radicals R', and therefore r, is 0 or 1, and in the case of chelate-forming agents possibly also 2. If the aluminium compound is employed in addition to other network-forming agents, the number of hydrolyzable groups R can also be 1.

Concrete examples of aluminium compounds which are preferred according to the invention are Al(OCH$_3$)$_3$, Al(OC$_2$H$_5$)$_3$, Al(O—n—C$_3$H$_7$)$_3$, Al(O—i—C$_3$H$_7$)$_3$, Al(OC$_4$H$_9$)$_3$, Al(O—i—C$_4$H$_9$)$_3$, Al(O—sec—C$_4$H$_9$)$_3$, AlCl$_3$, AlCl(OH)$_2$, aluminium formate, aluminium acetate and aluminium oxalate, and the corresponding partly chelated compounds, such as, for example, Al(acetylacetonate)(O—i—C$_3$H$_7$)$_2$. Compounds which are liquid at room temperature, such as, for example, Al(O—sec—C$_4$H$_9$)$_3$ and Al(O—i—C$_3$H$_7$)$_3$, are particularly preferred.

Another group of network-forming agents employed according to the invention are those of the general formula $$E'R_qR'_r$$

in which E' represents titanium(IV) or zirconium(IV), the hydrolyzable groups R, which can be identical or different, are halogen, alkoxy or acyloxy and the non-hydrolyzable groups R' are, in particular, chelating ligands. Oligomers derived therefrom can also be used as network-forming agents. As regards the number of hydrolyzable radicals and chelating ligands, the comments already made for the aluminium compounds apply, which means that in the case of monovalent radicals R and R' q in the above formula in general assumes the values 2 to 4 and r the values 0 to 2, unless the titanium and zirconium compounds are present in addition to other network-forming agents, in which case q can also assume the values 0 and 1 and r values up to 4.

Concrete examples of compounds of titanium or zirconium are TiCl$_4$, ZrCl$_4$, Ti(OC$_2$H$_5$)$_4$, Ti(OC$_3$H$_7$)$_4$, Ti(O—i—C$_3$H$_7$)$_4$, Ti(OC$_4$H$_9$)$_4$, Ti(cresyl)$_4$, Zr(O—i—C$_3$H$_7$)$_4$, Zr(OC$_4$H$_9$)$_4$, Ti(acetylacetonate)$_2$-(O—iC$_3$H$_7$)$_2$, Ti(2-ethylhexoxy)$_4$ and other mono- or polynuclear titanium or zirconium complexes with chelating ligands, which are preferably coordinated via oxygen and/or nitrogen (for example ethylenediamine, alkylated derivatives thereof and 2,2-dipyridyl), and, if they are used as the sole network-forming agent, also contain two hydrolyzable groups R.

Other network-forming agents which have not yet been mentioned above and can be employed according to the invention are to be found amongst the low-volatility oxides of the elements B, Ge, Sn, P and As which are soluble in the reaction medium or compounds of these elements which form such low-volatility oxides and are soluble in the reaction medium.

Compounds which are soluble in the reaction medium and form low-volatility oxides are, for example, inorganic acids, such as phosphoric acid, arsenic acid and boric acid, and esters thereof. Further suitable compounds are, for example, halides, such as SnCl$_4$ and PCl$_5$, and alkoxides, such as Ge(OR'')$_4$ and Sn(OR'')$_4$, R'' being derived from lower alcohols, such as methanol, ethanol, propanol or butanol. The use of compounds which also contain non-hydrolyzable radicals R', for example alkyl or phenyl, in addition to the hydrolyzable groups of the compounds just mentioned is also possible. The comments made for aluminium compounds and titanium and zirconium compounds correspondingly apply to the number of hydrolyzable groups R.

One or more network-forming agents can be employed in the process according to the invention, at least one of which must contain 2 hydrolyzable groups R. If appropriate, the network-forming agents can also be in pre-condensed form.

Schematic Representation of the Course of the Reaction

The course of the complexing reaction according to the invention and the simultaneous or subsequent hydrolytic polycondensation reaction may be illustrated schematically by a concrete example in which the metal compound Pd(acetylacetonate)$_2$ (=Pd(acac)$_2$), the bifunctional compound H$_2$N-(CH$_2$)$_2$-NH-(CH$_2$)$_3$Si(OC$_2$H$_5$)$_3$ and the network-forming agent Si(OC$_2$H$_5$)$_4$ are reacted with one another in a ratio of 1:2:8:

$$Pd(acac)_2 + 2$$
$$H_2N\text{-}(CH_2)_2\text{-}NH\text{-}(CH_2)_3Si(OCH_2H_5)_3 + 8$$
$$Si(OC_2H_5)$$

If appropriate, the process can be carried out so that the reaction proceeds stepwise (see below). The first step is then formation of a complex compound between the metal compound and the bifunctional compound:

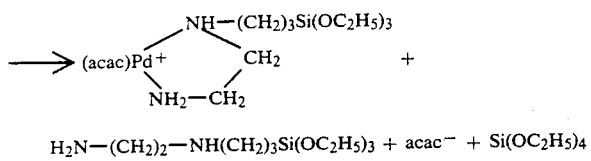

$$H_2N-(CH_2)_2-NH(CH_2)_3Si(OC_2H_5)_3 + acac^- + Si(OC_2H_5)_4$$

(intermediate product which can be isolated if appropriate).

Subsequent hydrolytic polycondensation or simultaneous hydrolytic polycondensation and complexing gives:

(Equation 1)

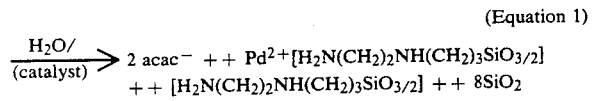

The symbol "++" means that the formulae thereby linked are not isolated, but are present in a macromolecular unit. Pd does not absolutely essentially have to be coordinated to only one bifunctional unit as in equation 1. If the steric circumstances allow, 2 or even more bifunctional units can also be bonded to the palladium cation.

Complete oxidation, subsequent to the reaction of equation 1, with an oxygen-containing gas at elevated temperatures (see below) leads to the following reaction:

$$2\ acac^- ++ Pd^{2+}[H_2N(CH_2)_2NH(CH_2)_3SiO_{3/2}]$$
$$++ [H_2N(CH_2)_2NH(CH_2)_3SiO_{3/2}] ++ 8SiO_2 \xrightarrow{oxidation}$$

$$PdO.2SiO_2.8SiO_2 + CO, CO_2 + H_2O + N_2, NO, NO_2$$

If reduction is then carried out, the following is finally obtained:

$$PdO.10SiO_2 \xrightarrow{e.g.\ H_2} Pd.10SiO_2$$

Written in the general form, the equation of the overall reaction of complexing and hydrolytic polycondensation reads as follows (M, X, Y, A (assumed to be non-charged), E, R, R', z, m, n, o, p, q and r have the meanings given above; k and l denote the molar ratio of the compounds $AzER_oR'_p$ (bifunctional compound) and $ER_qR'_r$ (network-forming agent) used in comparison with the metal compound $MX_mY_{n'}$. Here, $k \geq 1$, whereas $l \geq 0$ (see below)):

$$MX_mY_n + k\ AzER_oR'_p + l\ ER_qR'_r \xrightarrow{H_2O}$$
$$X^- ++ (X_{m-1}Y_n)M^+(AzEO_{1/2o}R'_p)_k ++ (EO_{1/2q}R'_r)_l$$

If appropriate, an intermediate stage can also be prepared here, as in the above example, and if appropriate $M^+$ can be coordinated with more than one group ($AzEO_{1/2o}R'_p$). "++" has the same meaning as above.

The subsequent complete oxidation can be represented in general as follows:

$$X^- ++ (X_{m-1}Y_n)M^+(AzEO_{1/2o}R'_p)_k ++ (EO_{1/2q}R'_r)_l \xrightarrow{oxidation}$$
$$MO_s.(k+l)EO_{1/2(o+p+q+r)} + CO, CO_2 + H_2O +$$

-continued $$SO_2 + N_2, NO, NO_2$$

The number of oxygen atoms in the metal oxide, s, depends on the oxidation level of the metal.

Finally, if a reduction is carried out, the following is obtained:

$$MO_s.(k+l)EO_{1/2(o+p+q+r)} \xrightarrow{reduction} M.(k+l)EO_{1/2(o+p+q+r)}$$

DESCRIPTION OF THE PROCESS

Stage a) of the process according to the invention can be carried out in two different ways: on the one hand by the so-called "in situ" process (process variant A), in which the metal compound (1), the bifunctional compound (2) and if appropriate the network-forming agent (3) are subjected to a simultaneous complexing and hydrolytic polycondensation reaction; or by process variant B, wherein the complexing between the metal compound (1) and the bifunctional compound (2) is first effected in an anhydrous medium, the complex is isolated if appropriate and a hydrolytic polycondensation is then carried out, if appropriate in the presence of the network-forming agent (3) (process variant B).

Process Variant A

In this process, the gel containing the metal compound in complexed form is prepared in a manner analogous to that customary in the sol-gel process, by adding the necessary water, all at once or gradually, at the start of the process. The reaction is carried out in a liquid homogeneous phase; if the starting compounds are in liquid form, the use of a solvent may be superfluous.

Suitable polar solvents for carrying out the sol-gel process are, for example, lower alkanols, such as methanol, ethanol and isopropanol, ketones, preferably lower dialkyl ketones, such as acetone and methyl isobutyl ketone, ethers, preferably lower alkyl ethers, such as diethyl ether and tetrahydrofuran, amides, such as dimethylformamide, and esters, such as ethyl acetate, and mixtures thereof. Of these, water-miscible solvents or solvent mixtures are particularly preferred.

The proportions of the starting compounds can be varied within wide limits depending on the desired properties of the composite material. The highest metal oxide or metal concentration can be obtained if the metal compound (1) and the bifunctional compound (2) are used in a ratio of 1:1 without the presence of a network-forming agent (3). The ratio of 1:1 of bifunctional compound (2): metal compound (1) is just high enough to guarantee complete complexing of the metal. In general, however, higher ratios of (2):(1) will be chosen, for example up to 20:1 or more. If desired, the metal oxide or metal content can be kept very low by employing, in addition to a large excess of the bifunctional compound (2), an even larger excess of the network-forming agent (3), for example in a molar ratio of 1:20:400 [metal compound (1): bifunctional compound (2): network-forming agent (3)]. The molar ratio of metal compound (1) to network-forming agent (3) can likewise be varied within wide limits; for example, it can be 2:1, 1:1, 1:5 to 50 and up to 1:300 or more. The ratio of metal oxide or metal to network-forming agent in the end product has relatively little influence on the average size of the particles of metal oxide or metal within wide limits.

Moreover, the composite product becomes more porous, the greater the content of bifunctional compound (2), since at the points where the bifunctional compound (II) is incorporated into the network, the organic constituents escape as gases during the subsequent oxidative treatment and leave behind pores in the composite material. It is also possible to control the porosity and the specific surface area via the proportion of network-forming agent (3).

The starting compounds and the reagents, in particular water, can be added in various ways. The addition of water above all may be very critical and is therefore discussed in detail below. The metal compound (1) and the bifunctional compound (2) are usually added at the start of the reaction, and in the case of a large excess of the compound (2), some of this can also be added in the course of the process. Usually, the metal compound (1) is initially introduced into the solvent and the bifunctional compound (2) is added. The reverse sequence may be appropriate if complexing can be achieved only with difficulty without a large excess of complexing compound.

If a network-forming agent (3) is added, this is as a rule done after the addition of the abovementioned compounds, but before the addition of water. If two or more network-forming agents which hydrolyze at different rates are added, the addition can be made at different times in the course of the hydrolytic polycondensation.

In process variant A, the water is added for the hydrolysis at or from the start of the reaction in one of the manners customary in the sol-gel process. Thus, the starting compounds, as such or as a solution in one of the abovementioned solvents, can be brought into contact all at once or stepwise with the stoichiometrically required amount of water, but preferably with an excess of water. The best manner of bringing the components into contact depends inter alia on the reactivity of the starting compounds employed. Thus, for example, the dissolved starting compounds can be slowly added dropwise to an excess of water, or water is added in one portion, which is the preferred procedure for less reactive starting materials, or in more portions to the starting compounds, which are dissolved if appropriate.

It may also be beneficial not to add the water as such, but to introduce it into the reaction vessel with the aid of aqueous organic or inorganic systems. Introduction of the amounts of water into the reaction mixture with the aid of moisture-laden adsorbents, for example molecular sieves, and aqueous organic solvents, for example 80% strength ethanol, has proved to be particularly suitable in many cases. The water can also be added via a reaction in which water is formed, for example ester formation from acid and alcohol.

In many cases, the water is advantageously added in several stages, for example in three stages. In such instances, for example, one tenth to one twentieth of the amount of water required stoichiometrically for hydrolysis is added in the first stage. After brief stirring, one fifth to one tenth of the stoichiometric amount of water is added, and after further brief stirring a stoichiometric amount of water is finally added, so that a slight excess of water is present at the end.

The hydrolysis is as a rule carried out at temperatures between $-20°$ and $130°$ C., preferably between $0°$ C. and the boiling point of any solvent used. A particularly preferred temperature range is approximately $20°-70°$ C.

The hydrolysis and polycondensation with simultaneous metal coordination can be carried out, if appropriate, by addition of a conventional catalyst, such as a Bronsted acid or base, for example a proton acid, a metal hydroxide or an amine. Examples of suitable catalysts are organic or inorganic acids, such as hydrochloric acid or acetic acid, organic or inorganic bases, such as ammonia or alkali metal or alkaline earth metal hydroxides, for example sodium hydroxide, potassium hydroxide or calcium hydroxide, and amines which are soluble in the reaction medium, for example lower alkylamines or alkanolamines. Volatile acids and bases, in particular hydrochloric acid, ammonia and triethylamine, are particularly preferred. If the bifunctional compound (2) used is a Bronsted base, basic catalysis is preferred, so that the portion of the molecule intended as the ligand is not deactivated by protonation.

The time required to achieve complete hydrolysis and the end of the polycondensation reaction depends on the starting compounds employed and the reaction conditions and can easily be determined by a few test experiments.

The process variant A is presently the preferred preparation method for the composite materials of the invention.

Process Variant B

If appropriate, the process according to the invention can be carried out by first effecting the complexing reaction between the metal compound and the bifunctional compound serving as the complexing ligand, and then subsequently—if appropriate after prior isolation of the complex—effecting the hydrolytic polycondensation. The metal compound is dissolved in one of the abovementioned anhydrous solvents, as far as possible under an inert gas atmosphere. For this, the bifunctional complexing compound (2) is in general added dropwise at a low temperature, preferably approximately $0°$ C. The choice of the most advantageous solvent and the other reaction and working up conditions depend on the particular metal complex to be formed and are known to the expert.

The complex can then be subjected to hydrolytic polycondensation with or without addition of one or more network-forming agents of the formula (3), as is described for process variant A.

Alternatively, water can be added to the reaction mixture, without isolation of the complex, in order to effect hydrolytic polycondensation of the portion of the bifunctional complexing ligand capable of hydrolytic polycondensation. If desired, one or more network-forming agents (3) are also added, in general before the addition of water. The further reaction proceeds in exactly the same way as is described for process variant A.

When the reaction according to one of the process variants described above has ended, the excess solvent is carefully distilled off from the sol, if appropriate, or is allowed to evaporate in an open vessel. The polycondensate thus obtained is gelatinous to vitreous.

The polycondensate is then dried at temperatures of up to $200°$ C., preferably at approximately $120°$ C., for several hours, preferably 5 to 7 hours, in order to remove residues of water and solvent.

Before further processing, the dried polycondensate is powdered by customary methods.

Oxidation of the Polycondensate

The polycondensation product can be oxidized by wet chemical means in a liquid reaction medium or preferably by calcining in the presence of a gaseous oxidizing agent.

Oxygen is in general used as the gaseous oxidizing agent. A preferred reaction gas mixture is air or another gas mixture containing 80% of an inert gas and 20% of oxygen.

The oxidation is in general carried out by passing the dry oxygen-containing gas over the condensation product at temperatures of 200° to 700° C., preferably at 300° to 500° C. At lower reaction temperatures, residues of the elements C, N and/or S still remain in the polycondensate, which may be desirable. In this invention, however, these elements are preferably removed completely by oxidation during the calcining. It is advantageous not to choose the temperature for this higher than is necessary, in order to keep the surface diffusion of the metal cations and therefore the formation of larger oxide particles as low as possible. The temperature required varies depending on the nature of the organic radicals in the polycondensate. The lower temperature limit from which complete oxidation takes place can be determined with the aid of differential thermogravimetry. According to this method, the residual weight of the sample is determined during oxidation at various temperatures; the temperature from which the residual weight is constant is the lower temperature limit for complete oxidation.

The duration of the reaction is in general a few hours, preferably approximately 2 hours. If required, it can be determined by gravimetry by determining the time from which a constant weight arises, or by elemental chemical analysis, which no longer detects the elements C, N and S when the reaction has ended.

In the case of Pt and Ag, the metal is formed directly in the oxide matrix during this oxidation method since the oxides decompose into the elements at elevated temperatures.

The oxidation products which are preferred according to the invention now contain, in a high purity, only the central atoms of the network-forming agent (that is to say Si, Al, Ge, Sn, B, P and As) as oxides (oxide matrix) and metal oxides, or in certain cases (for example Pt, Ag) the elemental metal.

Oxidizing agents containing peroxo groups, for example hydrogen peroxide, peracids, salts and esters thereof and perborates, are used in oxidation by wet chemistry. Metal compounds are less preferred as oxidizing agents since they may contaminate the polycondensate. Possible solvents are the customary organic solvents and in particular water. The reaction is in general carried out in the neutral to acid pH range.

The reaction can be carried out such that residues of the elements C, N and S still remain in the polycondensate. In order to achieve complete oxidation of these elements, it is as a rule necessary to heat the oxidation medium. The end of the reaction can be recognized by the evolution of gas stopping, or the reaction time is known from test experiments in which the reaction product no longer showed the elements C, N and S on analysis.

It may be advantageous to combine the oxidation in a liquid medium, which then does not have to be complete, with subsequent calcining in the presence of a gaseous oxidizing agent.

Reduction of the Oxide Particles in the Oxide Matrix

The oxide particles in the oxide matrix can be reduced to metal particles either in a liquid medium or preferably by a gaseous reducing agent. Here also, the lowest possible temperatures are preferred, in order to avoid surface diffusion of the metal atoms to give larger particles. In both methods the reaction temperature and time vary considerably depending on the reduction potential of the metal.

Reduction by a gaseous medium can be carried out, for example, with hydrogen or carbon monoxide. Carbon monoxide can be used only for metals which do not form metal carbonyl compounds and have a low reduction potential, that is to say, for example, for palladium, which is formed from palladium oxide in an oxide matrix after treatment in a stream of carbon monoxide at 200° C. for two hours. Hydrogen is in general preferred as the reducing gas. This gas is allowed to flow under atmospheric pressure or increased pressure at temperatures between room temperature (for example in the case of Pd) and not more than 500° C., preferably 400° C. (for example in the case of Ni, Fe, Cu and Co) for some hours, preferably between 1 (Pd) and 5 hours (Ni, Fe, Cu, Co) over the sample to be reduced. The individual reaction conditions can be determined by test experiments by evaluating the sample by powder diffractometry, hydrogen titration, ESCA spectroscopy, SIMS, SNMS or magnetic measurements and the like.

The reduction in the liquid phase is in general carried out with a concentrated aqueous hydrazine solution. If desired, another polar solvent, such as alcohols, for example methanol, ethanol or also high-boiling di- and trialcohols, and an acid or basic catalyst can be used here. The reaction is carried out at room temperature up to the temperature of the boiling point of the reaction mixture, depending on the reduction potential of the metal. The end of the reaction can be determined as above.

In this case it may also be advantageous to carry out the reduction first in a liquid medium and then with a gaseous reducing agent.

The products of the oxidation reaction described above, the composite materials containing particles of metal oxide, are usually deeply coloured. The size of the metal oxide particles varies in the range from 0.2 to 10 nm, typically from 0.5 to 5 nm.

The composite materials which contain metal particles are blue to black in colour. The size of the metal particles corresponds to that of the oxides; it can be determined with the aid of scanning transmission electron microscopy. The size distribution of the metal particles is very narrow and their distribution in the oxide matrix is completely uniform. This allows metal loadings of the oxide matrix of, for example, 3 to 10%. In the case of a nickel composite, the formation of $Ni(CO)_4$ in a carbon monoxide atmosphere at room temperature was detectable, which likewise leads to the conclusion of a very fine nickel distribution and also the accessibility of the nickel atoms to a reaction. Acid-soluble metals can be dissolved out of the metal composites completely using acid. This likewise demonstrates that the entire metal contained in the composite material is accessible to any metal surface reactions. The composite materials according to the invention which contain metal particles are considerably less sensitive than comparable finely divided metals in elemental form. If they are oxidized by contact with oxygen or air, they can easily be regenerated by a reduction as described above.

The composite materials according to the invention can be further processed in the manner customary for ceramic materials, for example compressed to pellets.

The composite materials according to the invention are used in all instances where finely divided metal oxides and metals are required, for example in the field of catalysis. The electrical and electromagnetic properties of the metal composites also enable them to be used in electrical engineering and electronics.

The following examples illustrate the invention. The following abbreviations are used:
tetraethoxysilane: TEOS
acetylacetonate: acac
acetate: ac Preparation of $(CH_3)_2N(CH_2)_3Si(OC_2H_5)_3$ (A)

27.05 g (0.6 mol) of dimethylamine and 20 ml of petroleum ether are added to a solution of 36.12 g (0.15 mol) of 3-chloropropyltriethoxysilane and the mixture is then stirred in an autoclave under 30 bar at 150° C. for 12 hours. After the mixture has cooled to room temperature, the ammonium salt formed is filtered off and washed several times with petroleum ether. After removal of the solvent by distillation under normal pressure, the colourless liquid which remains is subjected to fractional distillation over a Vigreux column. Yield: 11.58 g (31%); melting point 100° C. under 8 mm Hg.

The following compounds are prepared in a similar manner or by the processes in U. Deschler et al., Angew. Chemie 98 1986), 237, and J. L. Speier et al., J. Org. Chem. 36 (1971), 3120:

| | |
|---|---|
| $(C_2H_5)_2N(CH_2)_3Si(OC_2H_5)_3$ | (B) |
| $(CH_3)_2NCH_2CH_2N(CH_3)(CH_2)_3Si(OC_2H_5)_3$ | (C) |
| $H_2NCH_2CH_2NH(CH_2)_3Si(OCH_3)_3$ | (D) |
| $H_2N(CH_3)_3Si(OCH_3)_3$ | (E) |

EXAMPLE 1

First 520 mg (3 mmol) of 3-aminopropyltriethoxysilane (E), followed by 6.71 ml (30 mmol) of tetraethoxysilane (TEOS) and then 17.5 ml of 0.2 N aqueous NH₃ solution are added to a solution of 305 mg (1 mmol) of palladium(II acetylacetonate (Pd(acac)₂) in 300 ml of ethanol, while stirring vigorously the ammonia solution added contains 7.5 times the amount of water required for complete hydrolysis of all the ethoxy groups).

The mixture is stirred in a closed vessel at 70° C. for 72 hours. The mixture is then transferred to an open vessel and the solvent is allowed to evaporate at room temperature. A pale yellow, sometimes vitreous residue remains, from which no Pd(II) ions can be washed out with water and ethanol. To bring the polycondensation to completion and remove the last residues of ethanol and water, the residue is then dried at 120° C. for 6 hours. The gel is subsequently powdered.

The polycondensate thus obtained is given the designation KA. It contains 4.2% of Pd.

The following polycondensates were prepared in a similar manner:

| Starting materials | Poly-condensate designation | Pd content |
|---|---|---|
| 1 mmol of Pd(acac)₂; 3 mmol of (E); | KB | 1.1% |
| 150 mmol of TEOS; 82.5 ml of 0.2 N NH₃ solution | | |
| 1 mmol of Pd(acac)₂; 2 mmol of (D); 70 mmol of TEOS; 38.7 ml of 0.2 N NH₃ solution | KC | 2.1% |
| 1 mmol of Pd(acac)₂; 3 mmol of (D); 8 mmol of TEOS; 0.74 ml of 0.2 N NH₃ solution | KD | 9.01% |

EXAMPLE 2

In each case 1 mmol of one of the nickel, platinum, iron, copper or silver compounds mentioned below was reacted with 3 mmol of one of the compounds (A)–(E) from the preparation example, 8 mmol of TEOS and 0.74 ml of 0.2 N NH₃ solution as in Example 1. The following polycondensates were obtained:

| Polycondensate designation | Starting compounds | Metal content |
|---|---|---|
| KE | NiCl₂ · 6H₂O, (D) | 6.03% |
| KF | NiCl₂ · 6H₂O, (C) | 4.59% |
| KG | NiCl₂ · 6H₂O, (B) | 5.91% |
| KH | Ni(ac)₂ · 4H₂O, (D) | 5.31% |
| KI | Pt(acac)₂, (D) | 15.01% |
| KJ | Pt(acac)₂, (B) | 16.84% |
| KK | FeCl₂ · 4H₂O, (D) | 6.08% |
| KL | Fe(acac)₃, (D) | 4.09% |
| KM | Fe(NO₃)₃, (D) | 4.89% |
| KN | CoCl₂ · 6H₂O, (D) | 5.99% |
| KO | CO(ac)₂ · 4H₂O, (D) | 6.01% |
| KP | Cu(ac)₂ · H₂O, (B) | 5.57% |
| KQ | CuCl₂ · 2H₂O, (B) | 7.15% |
| KR | Cu(ac)₂ · H₂O, (D) | 6.68% |
| KS | CuCl₂ · 2H₂O, (D) | 8.87% |
| KT | AgNO₃, (D) | 4.56% |

The following polycondensates of very high metal content were also prepared in an analogous manner, metal compound: (B) or (D): TEOS being reacted in a ratio of 1:2:1:

| Starting compounds | Polycondensate designation |
|---|---|
| Ni(ac)₂ · H₂O, (D) | KH' |
| Pt(acac)₂, (B) | KJ' |
| Fe(acac)₃, (D) | KL' |
| Co(ac)₂ · 4H₂O, (D) | KO' |
| Cu(ac)₂ · H₂O, (B) | KP' |
| Pd(acac)₂, (D) | KD' |

EXAMPLE 3

250 mg (1.0 mmol) of the compound (C) are added dropwise to a solution of 225 mg (0.5 mmol) of Na₂[PtCl₆] in 15 ml of ethanol at 0° C., and the mixture is then kept at 65° C. for 2 hours. The solution becomes cloudy because of a little precipitated polycondensate. After the precipitate has been removed, a finely crystalline precipitate of Pt[(CH₃)₂N(CH₂)₂N(CH₃)(CH₂)₃—Si(OC₂H₅)₃]Cl₂ can be obtained from the clear yellow solution at room temperature. This platinum complex has a melting point of 16° C. (decomposition).

EXAMPLE 4

To oxidize the organic constituents of the polycondensates KA, KB, KC and KD from Example 1, a dry stream of air is passed at a temperature of 500° C. over the powdered gel for 1 to 2 hours (stream of air of 100 ml/minute). A brown powder of the composition PdO xSiO$_2$, wherein x assumes the values 33, 153, 72 and 11, according to the composition of KA, KB, KC and KD, results.

The following PdO composite materials were obtained in this manner:

PdO composite prepared from KA:
Oxidation for 2 hours at 500°;
Elemental analysis: C 0.2, N 0.0, Pd 4.5%;
BET surface area 470 m$^2$/g;
Specific pore volume 1.57 cm$^3$/g.
PdO composite prepared from KB:
Oxidation for 1 hour at 500°;
Elemental analysis: C 0.4, N 0.0, Pd 1.1%;
BET surface area 229 m$^2$/g;
Specific pore volume 0.32 cm$^3$/g.
PdO composite prepared from KC:
Oxidation for 2 hours at 500°;
Elemental analysis: C 0.2, N 0.0, Pd 2.3%;
BET surface area 354 m$^2$/g;
Specific pore volume 2.30 cm$^3$/g.

EXAMPLE 5

Oxidation of the polycondensates from Example 2 was achieved by heating at 500° C. in a stream of compressed air for 5 hours. The following metal oxides were detectable by X-ray in the metal oxide composites obtained from the polycondensates KH', KL', KP' and KD':

| | Starting material of the oxide composites | | |
|---|---|---|---|
| NiO | cubic | graphite-grey color | KH' |
| α Fe$_2$O$_3$ | trigonal | red-brown color | KL' |
| CuO | monoclinical | green-grey color | KP' |
| PdO | tetragonal | dark blue color | KD' |

The composite containing cobalt oxide was X-ray amorphous (colour: steel blue).

Under the conditions mentioned above, no composite containing platinum oxide can be obtained from the platinum-containing polycondensates KI and KJ; platinum oxide formed decomposes at this temperature into elemental platinum and oxygen. A composite containing platinum metal is thus obtained without reduction.

The analytical values of the polycondensate KP from Example 2 after the oxidation were: N 0.0%, C 0.0%, H 0.23%. The oxidation of the organic constituents thus proceeded to completion.

EXAMPLE 6

To reduce the palladium oxide particles of the PdO composites prepared from the polycondensates KA, KB and KC from Example 1, hydrogen is passed over the material containing palladium oxide at room temperature for 2 hours. A grey powder of the composition Pd xSiO$_2$, wherein x has the same values as in Example 4, is obtained.

The composite materials containing individual palladium particles are characterized as follows (for the meaning of KA, KB and KC, see Example 1):

Pd composite prepared from KA:
Elemental analysis: C 0.4, N 0.0, Pd 4.6%;
BET surface area 469 m$^2$/g;
Specific pore volume 1.77 cm$^3$/g.
Average Pd particle diameter: 2.3 nm, distribution 1.25–3.75 nm, see FIG. 1.
Pd composite prepared from KB:
Elemental analysis: C 0.5, N 0.0, Pd 1.1%;
BET surface area 206 m$^2$/g;
Specific pore volume 0.32 cm$^3$/g;
Average Pd particle diameter: 2.1 nm, distribution 0.75–3.75 nm, similar to FIG. 1.
Pd composite prepared from KC:
Elemental analysis: C 0.4, N 0.0, Pd 2.4%;
BET surface area 342 m$^2$/g;
Specific pore volume 1.98 cm$^3$/g;
Average Pd particle diameter: 2.0 nm, distribution 0.75–3.75 nm, similar to FIG. 1.

EXAMPLE 7

The reduction described in Example 6 of the PdO composites prepared from the polycondensates KA, KB and KC described in Example 1 to give Pd composites was carried out at 200° C. for 2 hours with carbon monoxide instead of hydrogen. The same products as in Example 6 were obtained here.

EXAMPLE 8

The reduction of the composite materials containing metal oxide from Example 5 was carried out in a stream of H$_2$ at 400° C. for 5 hours. The composite containing palladium oxide could be reduced at room temperature.

The metal-containing composite materials had the following colour after the reduction:
Iron-containing composite: brown-black,
Nickel-containing composite: black
Palladium-containing composite: brown-black
Copper-containing composite: brown-black
Cobalt-containing composite: steel blue.

We claim:
1. A process for the preparation of composite materials which contain small particles of metal or metal oxide in an oxide matrix, which comprises
    a) subjecting (1) one or more metal compounds and (2) one or more bifunctional compounds which contain at least one group capable of complexing the metal and at least one group which forms an inorganic network during the polycondensation, and if appropriate (3) one or more network-forming agents which are capable of polycondensation to the conditions of a complexing reaction and hydrolytic polycondensation by the sol-gel process in a liquid reaction medium, compounds (1), (2) and (3) being soluble in the reaction medium, and
    b) oxidizing the resulting polycondensate to form a composite material which contains small metal or metal oxide particles in an oxide matrix, and if appropriate
    c) reducing the metal oxide particles of the composite material to the metal.

2. A process according to claim 1, wherein the metal compound used which is soluble in the reaction medium has the general formula I:

$$M_iX_mY_n \quad (I)$$

in which M represents a neutral or positively charged metal atom, X is an anion, Y is a neutral ligand, i is an integer having a value $\geqq 1$ and m and n have the value zero or are integers having a value $\geqq 1$, (m+n) having a value sufficient for compensation of the charge and for coordination saturation of $M_i$.

3. A process according to claim 2 wherein in the formula $$M_i X_m Y_n$$

M represents one or more metals selected from gallium, indium, thallium, tin, lead, antimony, bismuth or the transition metals including the lanthanides and actinides, if appropriate, in combination with a metal selected from alkali or alkaline earth metals, X is selected from mono-, bis- or trivalent anions consisting of elements selected from carbon, nitrogen, oxygen and hydrogen, and Y is a neutral ligand consisting of elements selected from carbon, nitrogen, oxygen, sulphur and hydrogen.

4. A process according to claim 1 wherein the bifunctional compound used which is soluble in the reaction medium has the general formula II:

$$A_g z[ER_o R'_p]_h \qquad (II)$$

in which A is a group which is capable of complexing the metal of the metal compound (1), z is a hydrolysis-stable bridge group, $[ER_o R'_p]$ is a group which forms an inorganic network during the polycondensation, g, h and o are integers having a value $>0$ and p has the value zero or is an integer having a value $\geqq 1$, (o+p) having a value adequate for charge compensation with E.

5. A process according to claim 4 wherein in the general formula $$A_g z[ER_o R'_p]_h$$

the complexing group A is an electron donor of neutral or negative electric charge and consists of elements selected from carbon, nitrogen, oxygen, sulphur and hydrogen, or a single bond, and the central atom E of the network-forming group $[ER_o R'_p]$ is selected from silicon, aluminium, titanium, zirconium, tin, germanium, boron, phosphorus or arsenic.

6. A process according to claim 1 wherein the network-forming agent used which is soluble in the reaction medium has the general formula III:

$$ER_q R'_r \qquad (III)$$

in which E is an element which forms inorganic networks and which is selected from silicon, aluminium, titanium, zirconium, tin, germanium, boron, phosphorus or arsenic, R is a hydrolyzable radical and R' is a nonhydrolyzable radical, q is an integer having a value $\geqq 2$ and r has the value zero or is an integer having a value $\geqq 1$, (q+r) having a value adequate for compensating the charge with E.

7. A process according to claim 1 wherein the metal compound (1) and the bifunctional compound (2) are used in at least a molar ratio which is adequate for coordination saturation of the metal of the metal compound.

8. A process according to claim 7 wherein the molar ratio of (1) to (2) is 1:1 to 1:20 or more.

9. A process according to claim 1 wherein the bifunctional compound (2) and the network-forming agent (3) are used in a molar ratio of 1:5 to 1:300 or more.

10. A process according to claim 1 wherein either the reaction in stage a) is carried out as a single stage, or the complexing reaction is first carried out in an anhydrous reaction medium, if appropriate the metal complex formed is isolated and the hydrolytic polycondensation is then carried out by the sol-gel process.

11. A process according to claim 1 wherein the oxidation in stage b) is carried out by wet chemistry with a suitable oxidizing agent or by calcining the polycondensate in an oxygen-containing atmosphere or by a combination of both.

12. A process according to claim 1 wherein the reduction in stage c) is carried out with a liquid or gaseous reducing agent.

13. A process according to claim 12 wherein the reduction with a gaseous reducing agent is carried out at a temperature $<500°$ C.

14. Composite materials which contain small particles of metal or metal oxide in an oxide matrix and are obtainable by the process of claim 1.

* * * * *